United States Patent
Wallace et al.

(10) Patent No.: US 9,893,522 B2
(45) Date of Patent: Feb. 13, 2018

(54) PARALLELING OF ACTIVE FILTERS WITH INDEPENDENT CONTROLS

(71) Applicant: TCI, LLC, Germantown, WI (US)

(72) Inventors: Ian Wallace, Whitefish Bay, WI (US); Ashish Bendre, Shorewood, WI (US); William Kranz, Fox Point, WI (US); Jeff Seibold, West Allis, WI (US)

(73) Assignee: TCI, LLC, Germantown, WI (US)

( * ) Notice: Subject to any disclaimer, the term of this patent is extended or adjusted under 35 U.S.C. 154(b) by 0 days.

(21) Appl. No.: 14/808,547

(22) Filed: Jul. 24, 2015

(65) Prior Publication Data

US 2015/0333516 A1 Nov. 19, 2015

Related U.S. Application Data

(62) Division of application No. 14/146,324, filed on Jan. 2, 2014, now Pat. No. 9,099,916.

(60) Provisional application No. 61/748,382, filed on Jan. 2, 2013.

(51) Int. Cl.
| | |
|---|---|
| *H02J 3/01* | (2006.01) |
| *H02M 1/15* | (2006.01) |
| *H02J 3/18* | (2006.01) |
| *H02M 1/12* | (2006.01) |

(52) U.S. Cl.
CPC ............ *H02J 3/01* (2013.01); *H02J 3/1821* (2013.01); *H02M 1/12* (2013.01); *H02M 1/126* (2013.01); *H02M 1/15* (2013.01); *H02M 2001/123* (2013.01)

(58) Field of Classification Search
CPC ............ H02J 3/01; H02J 3/1821; H02M 1/12; H02M 1/126; H02M 1/15; H02M 2001/123
See application file for complete search history.

(56) References Cited

U.S. PATENT DOCUMENTS

| | | | | |
|---|---|---|---|---|
| 4,591,963 | A * | 5/1986 | Retotar | H02M 1/12 363/17 |
| 5,568,371 | A * | 10/1996 | Pitel | H02J 3/01 361/113 |
| 7,050,914 | B2 | 5/2006 | Tzeng et al. | |
| 2009/0168474 | A1* | 7/2009 | Katoh | H02J 3/01 363/78 |
| 2011/0057517 | A1* | 3/2011 | Zhang | H02J 3/01 307/105 |
| 2011/0140767 | A1 | 6/2011 | Lin | |
| 2013/0057327 | A1 | 3/2013 | Ferriss et al. | |
| 2014/0197774 | A1* | 7/2014 | Liu | H02M 1/126 318/721 |

* cited by examiner

*Primary Examiner* — Jung Kim
(74) *Attorney, Agent, or Firm* — Nicholas A. Kees; Godfrey & Kahn, S.C.

(57) ABSTRACT

A parallel filter arrangement with at least two filters supplying current in line side sensing configuration and a number of sensors for measuring current. The sensors are used to determine the amount of current being supplied by the filters and the amount of current being supplied by a source. The filters adjust their supplied current in order to reduce or eliminate the amount of reactive or harmonic current being supplied by a source.

9 Claims, 14 Drawing Sheets

PARALLELING OF ACTIVE FILTERS WITH INDEPENDENT CONTROLS

CROSS REFERENCE TO RELATED APPLICATIONS

This application is a divisional application based on U.S. application Ser. No. 14/146,324, filed Jan. 2, 2014, and further claims the benefit of U.S. Provisional Patent Application Ser. No. 61/748,382, filed Jan. 2, 2013, the disclosures of which are hereby incorporated by reference herein in their entirety for all purposes.

FIELD OF THE INVENTION

The present invention relates generally to the field of controlling electrical devices that supply current into the electrical system. More particularly, the present invention relates to compensating for the harmonic or reactive currents drawn by non-linear electric loads with multiple parallel active filters with independent controls.

BACKGROUND OF THE INVENTION

Industrial plants often include power consuming devices such as, for example, electric motors, pumps, compressors and/or HVAC systems. These devices are often referred to as loads. Many industrial plants control the loads of their facility with electrical power converters to improve process control and increase energy efficiency such as, for example through the regulation of variable speed devices and the minimization of inefficient power consumption. Power converters typically behave as non-linear loads. A non-linear load draws distorted input current at multiple frequencies from the electrical power source, whether that source is supplied by a utility or a local generator.

As seen in FIG. 1, distorted currents 14 are currents that have at least a fundamental component 10 and a harmonic component 12. The fundamental component 10 delivers the energy for the load to do useful work. Although necessary for non-linear loads, the harmonic component 12 of the current(s) 14 performs no useful work.

The harmonic component 12 is harmful to utility transformers, local generators and other electric loads on the same electric supply as they cause excessive heating, voltage distortion on the electrical supply and potentially impact operation of other equipment sharing the power source.

In order or keep the harmonic component drawn from a source at a safe level, electric utilities and end users are adopting uniform power quality standards such as IEEE-519. One way electric utilities and end users are complying with uniform power quality standards is by using harmonic filters to locally source the harmonic component needed by the non-linear load. If a harmonic filter supplies the harmonic component required by the non-linear load, the harmonic component supplied by the power source is significantly reduced or eliminated.

One type of filter being used to comply with uniform power quality standards is an electronic active filter. Electronic active filters effectively act as a local harmonic component source to supply the necessary harmonic component to non-linear loads. Such electronic active filters have been typically used as a shunt as shown in FIG. 2. The electronic active filter 16 operates as a shunt connected current source by creating an output current, $I_{AF}$ 18, for supplying the harmonic component 12 for the non-linear load(s) 20. In this arrangement, the electronic active filter 16 produces the harmonic current 12 drawn by the non-linear load(s) 20, eliminating a harmonic component from being drawn from the source 22. As a result, the source 22 supplies a source current 24, via $I_{source}$, containing the fundamental current 10 in accordance with the uniform power quality standards.

Shunt electronic active filters generally have two main structures, a power circuit 26 and an independent control system 28, as seen in FIG. 3. The power circuit 26 is used to produce the harmonic component 12 and inject the harmonic component into the electrical system. The independent control system 28 is used to determine what harmonic component 12 should be produced, referred to as current reference, and control the power circuit to accurately produce and track the current reference(s). The shunt electronic active filter could also be used to produce a volt-ampere reactive.

As seen in FIG. 3, the independent control system 28 generally consists of an outer loop regulator 30, an inner current regulator 32 and a voltage modulator 34. The outer loop regulator 30 receives the current(s) 14 of the electrical system desired to be filtered. Based upon the current(s) 14, the outer loop regulator 30 generates a filter reference signal for the current, that is, current reference 36. The inner current regulator 32 receives the current reference 36 as well as feedback measurements 39 of the output of the electronic active filter 16. Based upon the current reference 36 and feedback measurement 39, the inner current regulator 32 generates a voltage reference 38. The voltage modulator 34 receives the voltage reference 38 and converts that voltage reference 38 to gate signals 40 that are output to the power circuit 26.

FIG. 4 shows the schematic of an exemplar electronic active filter power circuit 26. The illustrated power circuit 26 is capable of injecting 3-phase harmonic currents (e.g. $I_{AF\_A}$, $I_{AF\_B}$, $I_{AF\_C}$) into a 3-phase electrical system; however other power circuits are known in the industry and the use of such power circuits would not depart from the spirit of the invention.

The illustrated power circuit 26 contains a two level DC to AC power converter 42 consisting of the DC bus capacitor, $C_{DC}$ 44, and six power electronic switches, $Q_{1-6}$ collectively 46. The switches 46 can be of any type, but are shown for explanatory purpose as IGBTs. The IGBTs shown are controlled by gate signals to turn on and turn off at switching frequencies higher than the frequency of the electrical system's fundamental component 10, as determined by the independent control system 28, to produce voltages $Vpole\_A$, $Vpole\_B$, $Vpole\_C$.

A three-phase low pass LCL filter (e.g. $L_1$, $C_1$, $L_2$) 47 converts each of the voltages $Vpole\_A$, $Vpole\_B$, $Vpole\_C$, into the three-phase output currents (e.g. $I_{AF\_A}$, $I_{AF\_B}$, $I_{AF\_C}$). The filter 47 locally filters out extraneous or unwanted currents, such as the high frequency switching ripple current, but allows the lower frequency harmonic currents to pass into the electrical system. The control system 28 determines the pattern of IGBT gate signals ($G_{Q1}$-$G_{Q6}$) 40 that most accurately produce the necessary harmonic component 12 in the active filter output current 18.

The current(s) 14 of the electrical system desired to be filtered can be determined and supplied to the outer loop regulator 30 of the independent control system 28 in a number of different ways. The two most common ways for a single, e.g. non-paralleled, electronic active filter to obtain the current(s) 14 of the electrical system desired to be filtered are load side sensing and line side sensing.

Load side sensing is an open loop control method in which the load current ($I_{Load}$) is directly or indirectly sensed. FIG. 5 shows an example of direct sensing of the load side. The load current(s) 14, $I_{Load}$, is sensed for example, by a current sensor 50. Although a current sensor is described, the term is intended in a broad sense, and a number of devices are known in the industry to sense current, e.g. a transducer. The sensed current(s) 48 of the load current(s) 14, broadly defined as the sensed current itself or at least a signal representing or indicating that current or the level or value of that current or a component of that current, is received by the outer loop regulator 30. The outer loop regulator 30 extracts the fundamental component 10 from the sensed current(s) 48. The extraction of fundamental component 10 can be done by a high pass filter although other devices are known in the industry. The fundamental component 10 can be determined by a number of methods known in the industry such as an adaptive notch filter with a phase lock loop to determine the notch frequency.

After the fundamental component 10 is stripped from the sensed current(s) 48, the harmonic component 12 of the sensed current 48 is used to output a current reference 36 to the inner current regulator 32. The filter output current 18, e.g. $I_{AF}$, of the power circuit 26 is sensed for example, by a current sensor 52, and provided to the inner current regulator 32. Here again, the output of the current sensor 52 is broadly defined as the sensed current itself, a component thereof or at least a signal representing or indicating that current or the level or value of that current. A summation junction 54 of the inner current regulator 32 compares the current reference 36 to the sensed current feedback 39 to determine a comparison or error 56 which is sent to a compensator 58, G, such as for example via a comparison signal. The inner current regulator 32 is represented in FIG. 5 as a standard closed loop regulator although other methods for regulating the power circuit are known and used in the industry. The compensator 58 processes the error 56 and outputs a voltage reference 38. The voltage modulator 34 receives the voltage reference 38 and, based on that voltage reference, outputs gate signals 40 to the power circuit 26. Power circuit 26 thereby outputs a current 18 to the electrical system as described above. From the point where the current reference 36 is output to the inner current regulator 32, to the point where a current 18 is output by the power circuit 26, is indicated as a dashed box 60, which will be referred to as the inner electronic active filter 60. The device enclosed by dashed box 61 will herein be referred to as the load side electronic active filter 61.

The compensator 58 could be designed for example, to meet current tracking performance metrics. A couple of exemplary or common compensator implementations include proportional; proportional and integral; and proportional, integral and differential compensators. Other implementations are known in the industry and could also be used without departing from the spirit of the invention. The harmonic component demand of the load current(s) 14 is supplied by the electronic active filter 61, thus eliminating the harmonic components from being supplied from the source 22.

Load side sensing can be beneficial because it can be relatively straight forward to implement in state of the art power converter controllers and because multiple active filters can be paralleled using this control method to reach higher current levels as described further below. However, load side sensing is an open loop control method which has inherent inaccuracies and is sensitive to open loop errors. For example, any errors in the current sensors 50, 52 or in the implementation of the inner current regulator 32 can lead to current regulator tracking errors and remnant harmonic currents in the source 22. Also, the physical installation of load side sensors can be difficult in certain applications, such as motor control centers where the load electrical bus is not easily accessible, or where multiple non-linear loads are present.

Line side sensing is an alternate method that overcomes many of the problems associated with load side sensing. As shown in FIG. 6, line side sensing is a closed loop control method wherein the sensed current(s) 48 of the source current 24, $I_{Source}$, is sensed for example, by a current sensor 50. The voltage could also be sensed, for example, in order to determine the fundamental frequency. Additional electrical system quantities could also be sensed with addition sensors. Because line side sensing is a closed loop control method, it is not as sensitive to open loop errors as is load side sensing and can yield better performance due to the closed loop control action. Further, line side sensing is usually easier to install because the AC voltage source bus in a facility is often more accessible for installing current sensors. Line side sensing also provides filtering for all non-linear loads present.

Once the current(s) of the source current 24 is sensed, the sensed current(s) 48 is sent to a filter controller 62. The filter controller 62 removes the fundamental component 10 and outputs the harmonic component 12 as a feedback 64 to the outer loop regulator 30.

In addition to receiving the harmonic component feedback 64 of the source current 24, the outer loop regulator 30 also receives a filter reference 66. Because it is desired in this illustrated example, that the source 22 supply no harmonic component 12, the filter reference 66 is set to zero. The summation junction 68 of the outer loop regulator 30 compares the harmonic component feedback 64 to the filter reference 66 to determine a comparison or error 70 which is sent to a compensator 71, $G_1$, such as for example via a comparison signal. The compensator 71 processes the error 70 and outputs a current reference 36. Due to the closed loop action, the outer loop regulator 30 outputs an often-adjusted current reference 36 to drive down the harmonic component feedback 64 being supplied by the source 22. At steady state, the current reference 36 is equal to the harmonic component 12 drawn by the non-linear load 20. Once current reference 36 is output, the inner electronic active filter 60 operates as previously described with reference to FIG. 5. Although the prior art circuit shown in FIG. 5 is shown and described using a filter reference 66, other means for generating an error 70 are known and used in the industry, including using no harmonic reference at all. From the point at which a feedback 64 is supplied to the outer loop regulator 30 up through the point that a current 18 is output by the power circuit 26 will be referred to as the line side electronic active filter 72.

Generally electronic active filters are rated based on their output current capacity. The necessary capacity of the electronic active filter(s) is based on the amount of harmonic component 12 in the load current(s) 14. In many applications, the amount of harmonic correction current needed to eliminate harmonic current from the source 22 exceeds the capacity of a single electronic active filter. In these cases, multiple electronic active filters with independent control systems are deployed in parallel using a combination of the line side and load side sensing.

FIG. 7 shows an example of parallel electronic active filters wherein all the electronic active filters are load line sensing. Because load side sensing is an open loop control method, as referred to above, multiple electronic active filters can be placed in parallel. FIG. 7 illustrates an exemplary embodiment wherein two load side electronic active filters 61, 61' are shown. A current sensor 50 senses the load current(s) 14 and outputs the sensed current 48 to both load side electronic active filters 61, 61'. Before the sensed current 48 is received by the outer current regulators of the load side electronic active filters 61, 61', the sensed current 48 is divided by the number of load side electronic active filters. Therefore, in a system with N parallel load side electronic active filters, each load side electronic active filter will operate on $1/N^{th}$ of the sensed current(s) 48 of the load current(s) 14 and supply to the electrical system via its harmonic component output 18 $1/N^{th}$ of the harmonic component 12 drawn by the non-linear load 20. The example illustrated in FIG. 7 is performed entirely using an open loop control method and therefore, as described above, has the inherent performance limitations of a single open loop active filter control method described above and, in fact, would be compounded based on the use of additional load side electronic active filters.

Another example of parallel electronic active filters is shown in FIG. 8. The example illustrated in FIG. 8 has one line side electronic active filter 72 and one load side electronic active filter 61. However, any number of load side sensing electronic active filters could be added because, as described above, load side sensing is an open loop control method and there is no conflict. In the embodiment shown in FIG. 8, a current sensor 50 senses the source current 24 and outputs the sensed current 48 to the fundamental extractor or filter controller 62 of the line side electronic active filter 72. Thereafter, line side electronic active filter 72 operates as described above. Another current sensor 50' senses the load current(s) 14 and outputs the sensed current 48' to the load side electronic active filter 61. Thereafter, the load side electronic active filter 61 operates as described above. Although the example illustrated in FIG. 8 is not performed entirely using an open loop control method, it is partially open loop, and to that extent still has the inherent performance limitations of a single open loop active filter described above.

Yet another example of parallel electronic active filters is shown in FIG. 9, in which the load current(s) 14 is synthesized. This arrangement is used when the load bus is inaccessible for load side sensing. In this embodiment, the current sensor 50 outputs the sensed current 48 of the source current 24 to a summing junction 76 and also to a fundamental extractor or filter controller 62 of the line side electronic active filter 72. Thereafter, line side electronic active filter 72 acts as previously described above. A current sensor 75 senses the sum current 74 of the currents 18, 18' being output by the electronic active filters 72, 61 respectively. The sum current 74 is output to the summation junction 76 and is compared to the sensed current(s) 48, the result of which is called the synthesized load current 78. Summing junction 76 could be, for example, a current sensor, or the function could be accomplished by a microprocessor. The synthesized load current 78 is sent to the load side electronic active filter 61, which operates as described above. In the example illustrated in FIG. 9, the total harmonic component or sum current 74 is measured directly with one current sensor 75; however, the sum current 74 could be determined by using a separate current sensor, e.g. 52, 52' to sense each output 18, 18' and sum the harmonic components such as, for example, by a summing junction. Although the example illustrated in FIG. 9 has a line side electronic active filter 72, it still has the inherent performance limitations of a single open loop due to the load side electronic active filter 61 being, as described above, set up in an open loop configuration.

Paralleling line side electronic active filters is not currently known, because any arrangement now known would result in uncontrolled and unacceptable circulating currents between filters, thereby reducing performance. A circulating current between electronic active filters is current that flows between filters and but does not cancel the load harmonic component being drawn from the source. Because each electronic active filter has a maximum current it is capable of producing, the additional circulating current reduces the current available to supply the harmonic component being drawn by the non-linear load, thereby allowing the harmonic component to be drawn from the source. As is seen from the examples provided herein, therefore, currently all paralleling schemes for multiple electronic active filters require some or all of the electronic active filters be configured in a load side sensing arrangement, which, as described further above, has inherent performance drawbacks.

As a result, there exists a need to parallel all electronic active filters in a line side sensing arrangement to capture the performance benefits of the closed loop control method described above, while still avoiding unacceptable circulating currents.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

The invention provides a parallel filter circuit for use with an electrical system having a number of filters and sensors, the electrical system being capable of connecting to a power source and capable of having at least one load connected thereto. The first filter is capable of producing a first current and connected to the electrical system at a first location downstream of the first current sensor. The second filter is capable of producing a second current at a second location downstream of the first current sensor. The first current sensor is capable of sensing at least a current of the electrical system, produces a first signal indicating the current of the electrical system and sends the first signal to the first and second filters. The second current sensor is capable of sensing the first current, produces a second signal indicating the first current and sends the second signal to the first filter. The third current sensor is capable of sensing the second current, produces a third signal indicating the second current and sends the third signal to the second filter. The first filter produces the first current and supplies the first current to the electrical system through the first location based at least in part upon the first signal, the second signal and a difference between the first current and the second current. The second filter produces the second current and supplies the second current to the electric system through the second location based at least in part upon the first signal, the third signal and the difference between the first current and the second current.

The present invention also relates to a method of reducing circulating current between two line side sensing electronic active filters in an electrical system that has a current source supplying current to a load. A current from the source is sensed. A first and a second current component are generated and sensed, and the difference between them is determined. The difference and the sensed current from the source are compared with a filter reference signal to arrive at a comparison. The first current component is adjusted using the comparison and the sensed first current component. The second current component is adjusted using the comparison and the sensed second current component.

In another embodiment the parallel filter arrangement is used in a circuit with at least one load. The parallel filter arrangement includes a first filter capable of producing a first current, a second filter capable of producing a second current and a first, second and third current sensor. The first current sensor produces a first signal indicating the first current. The second current sensor produces a second signal indicating the second current. The third sensor produced a third signal representing a current of the circuit located upstream from the first and second filters. The first filter produces the first current and supplies the first current to the circuit based at least in part upon the first signal and third signal. The second filter produces the second current and supplies the second current to the circuit based at least in part upon the second signal and the difference between the first signal and the third signal.

The invention also relates to a method of reducing circulating current between two line side sensing electronic active filters in an electrical system that has a current source supplying current to a load. A first current from the source is sensed at a first location. A second current from the source is sensed at a second location downstream from the first location. A first current component is generated, supplied downstream from the first location and sensed. A second current component is generated, supplied downstream from the second location and sensed. The first current component is adjusted using the sensed first current and the sensed first current component. The second current component is adjusted using the sensed second current and the sensed second current component.

In yet another embodiment, the parallel filter arrangement is used in a circuit with at least one load, with the parallel filter arrangement including a first filter capable of producing a first current, a second filter capable of producing a second current and a first, second, third and fourth current sensor. The first current sensor produces a first signal indicating the first current. The second current sensor produces a second signal indicating the second current. The third current sensor produces a third signal representing a current of the circuit located upstream from the first and second filters. The fourth current sensor produces a fourth signal representing a current of the circuit located upstream from the second filter and downstream from the first filter. The first filter produces the first current and supplies the first current to the circuit based at least in part upon the first signal and the third signal. The second filter produces the second current and supplies the second current to the circuit based at least in part upon the second signal and the fourth signal.

The invention further relates to a method of reducing circulating current between two line side sensing electronic active filters, wherein a current from the source is sensed. A first and second current component are generated and sensed. The first current component is adjusted using the sensed current from the source, the sensed first current component and a filter reference. The second current component is adjusted using the sensed current from the source, the sensed second current component, the sensed first current component and a filter reference.

The present invention also relates to a method of filtering a current drawn by a load from a current source that is providing a current in an electrical system, the electrical system having a first line side sensing electronic active filter and a second line side sensing electronic active filter. A current from the source is sensed. A fundamental current component and a harmonic current component are generated from the current sensed from the current source. At least a portion of the harmonic current component from the first line side sensing electronic active filter is supplied by means of supplying a first current component, and at least a portion of the harmonic current component from the second line side sensing electronic active filter is supplied by means of supplying a second current component. A difference between the first current component and the second current component is determined. The difference, the current from the current source and a filter reference signal is compared to arrive at a comparison signal. The first current component is adjusted using the comparison signal and the sensed first current component. The second current component is adjusted using the comparison signal and the sensed second current component.

Other objects and advantages of the invention will become apparent hereinafter.

DETAILED DESCRIPTION

Figure 1:
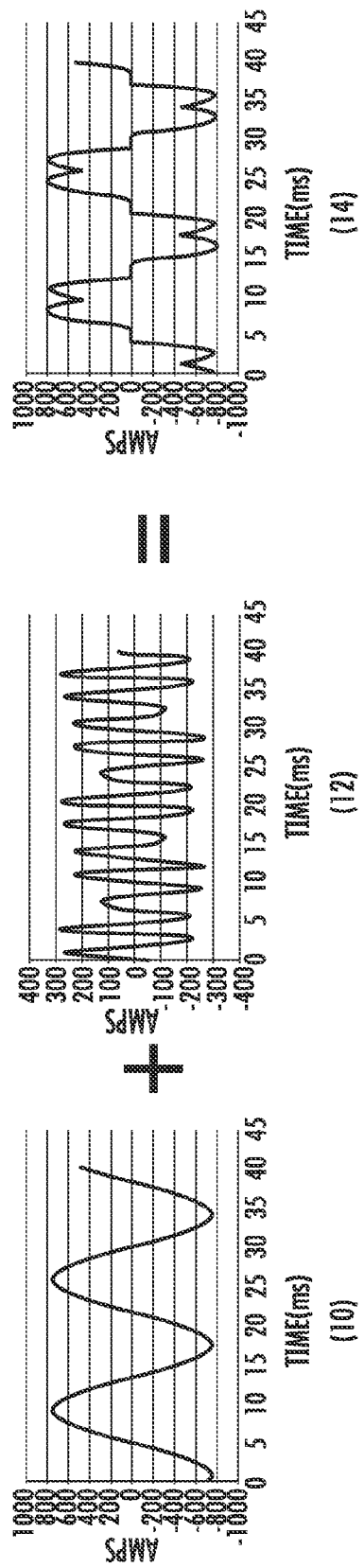
FIG. 1 is a series of conventional and fundamental charts showing some of the individual components comprising input current as a function of time.
Figure 2:
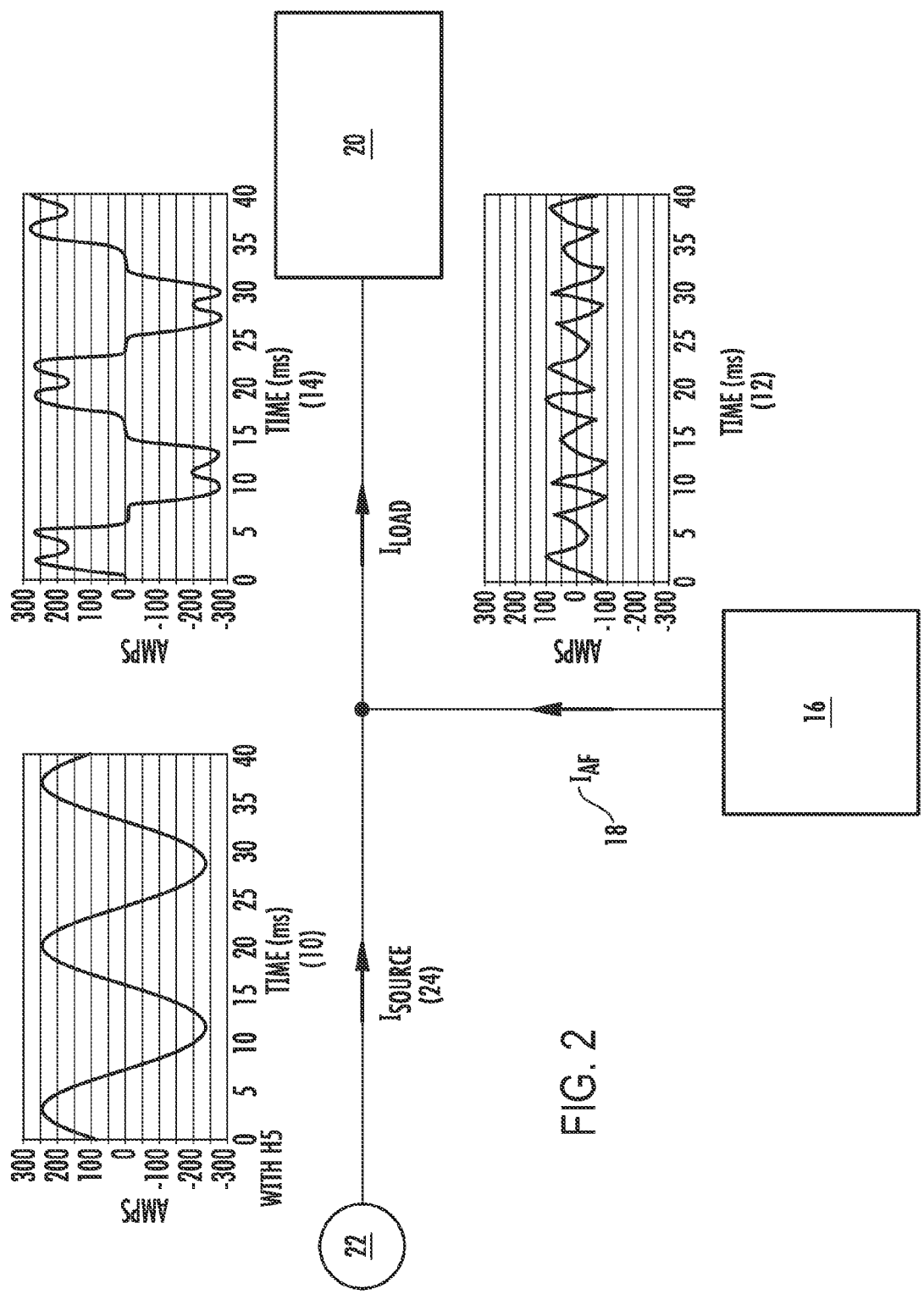
FIG. 2 is a schematic diagram of a known shunt electronic active filter arrangement.
Figure 3:
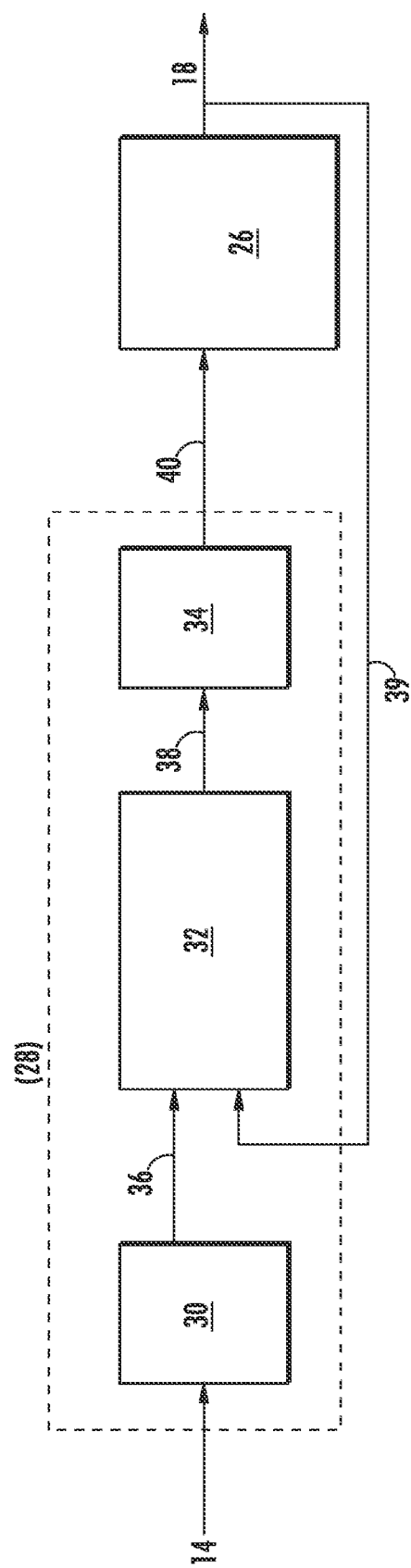
FIG. 3 is a schematic diagram of a conventional independent control system of an electronic active filter.
Figure 4:
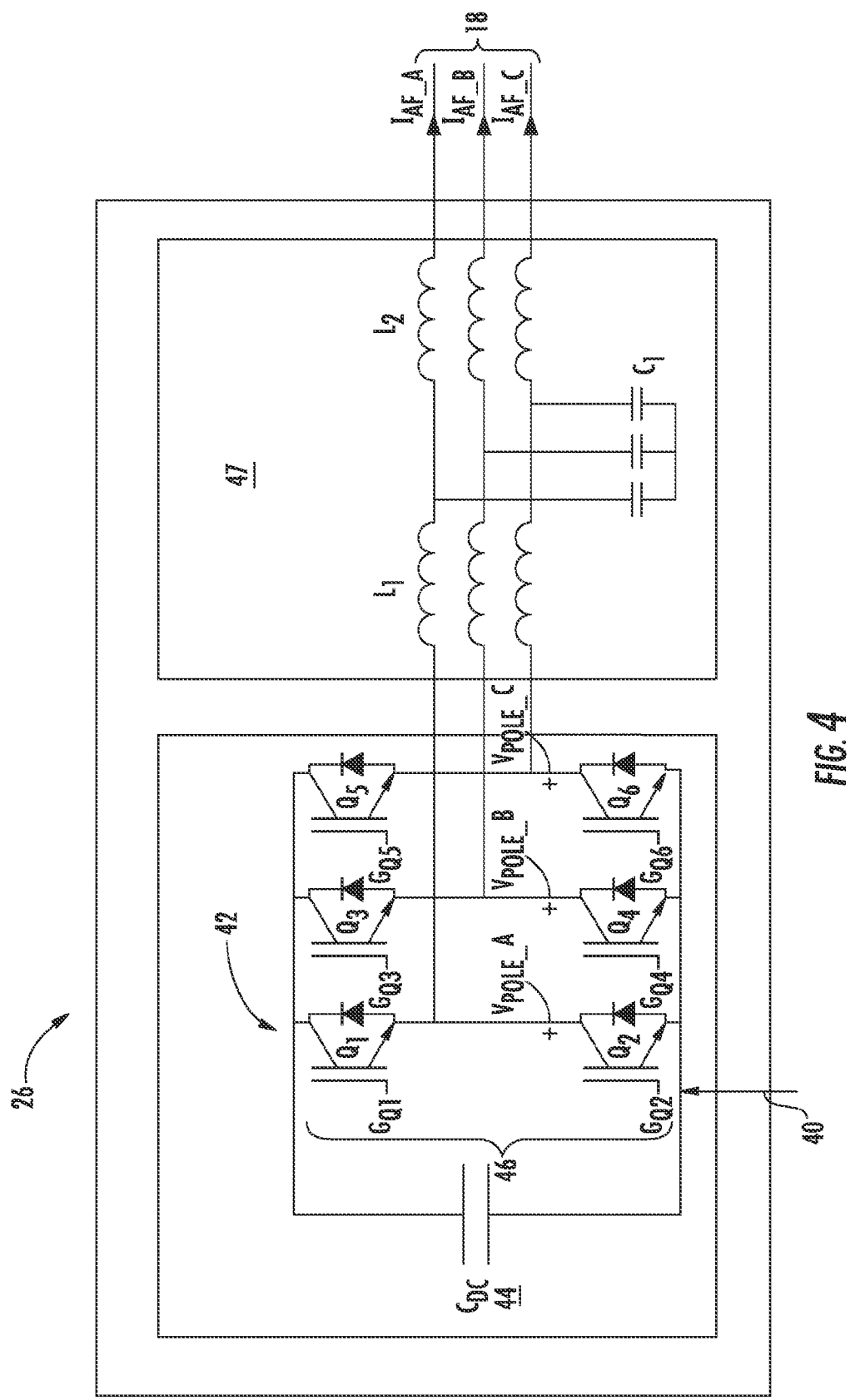
FIG. 4 is a schematic diagram of a known power circuit of an electronic active filter.
Figure 5:
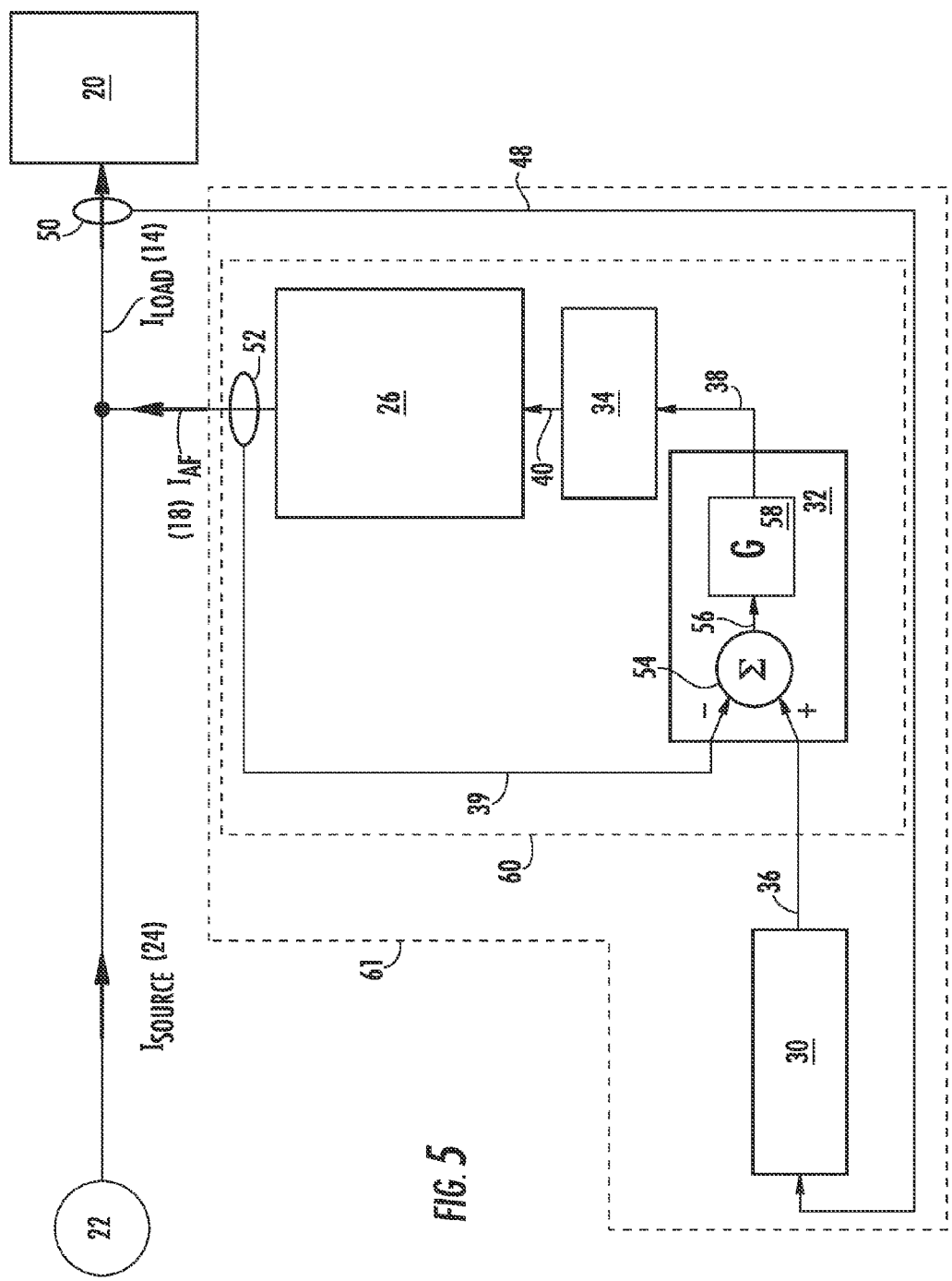
FIG. 5 is a schematic diagram of a prior art electronic active filter in a load side sensing arrangement.

Reference numerals appearing below that are the same as reference numerals appearing above refer to the same elements, including circuit elements, currents, and so on.

Figure 10:
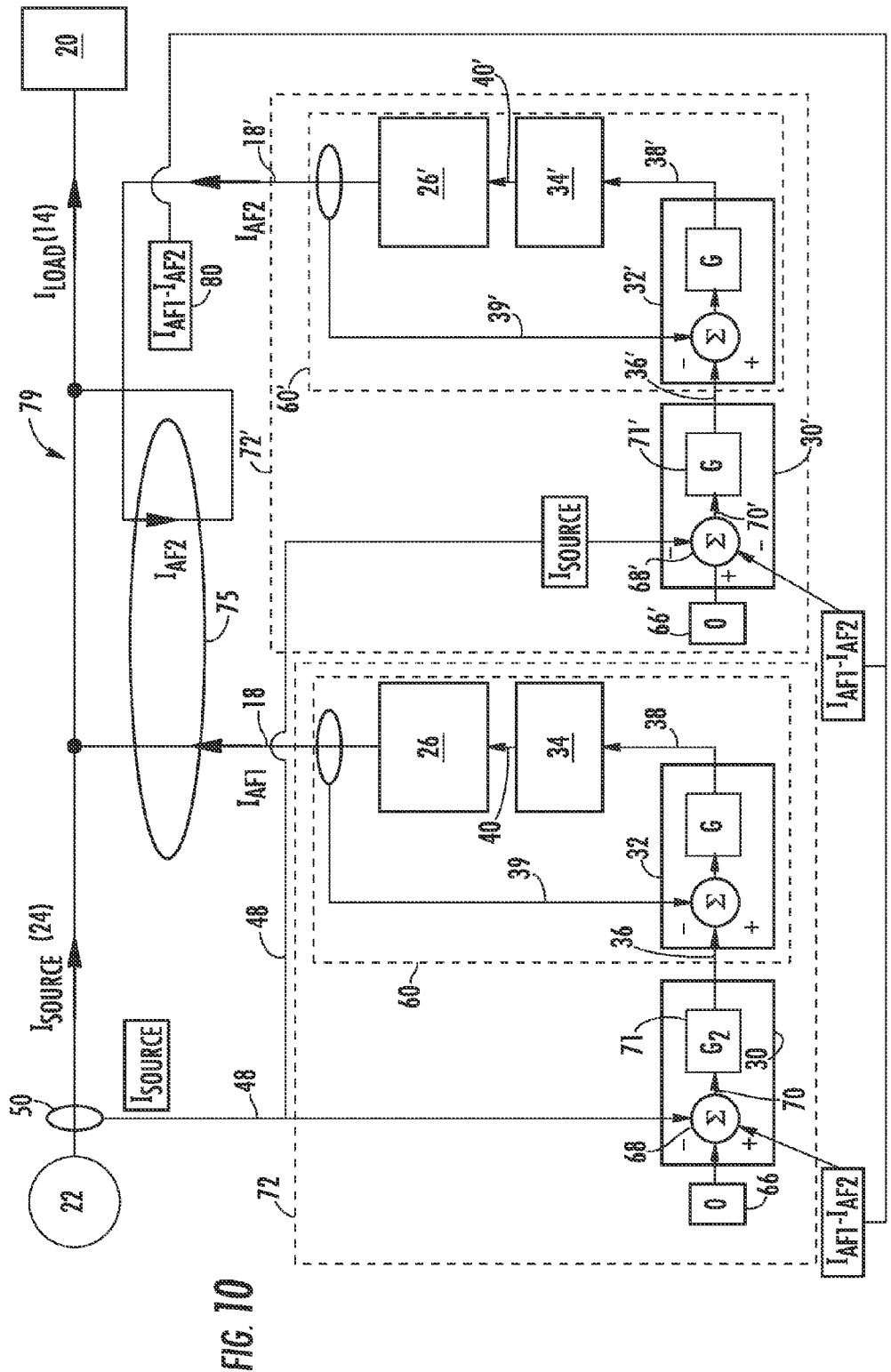
FIG. 10 is a schematic diagram of paralleling two electronic active filters in line side sensing arrangement with current difference feedback according to one embodiment of the present invention.

Referring now to FIG. 10, a parallel electronic active filter circuit 79 constructed according to one embodiment of the present invention has multiple electronic active filters configured in a line side sensing configuration. As shown in FIG. 10, a current sensor 50 senses the current of the source current 24 and outputs the sensed current 48, such as for example via a signal, to the first line side electronic active filter 72, and also to the second line side electronic active filter 72'. Another current sensor 75 is used to sense the difference or error 80 between the current 18 output by the first line side electronic active filter 72 and the current 18' output by the second line side electronic active filter 72'. In the illustrated example, one of the outputs is looped through sensor 75 so as to be inverted with respect to the other output, and thereby create a differential or error 80. In the example circuit shown in FIG. 10, it is the harmonic current output 18' that is so looped as to be inverse to the harmonic current output 18. As just described, the current sensor 75 outputs this error 80, such as for example via a signal, to the first line side electronic active filter 72, and also to the second line side electronic active filter 72'. The output of the current sensor 75 is broadly defined as the difference between the sensed currents itself, a component thereof or at least a signal representing or indicating that current or the level or value of that current.

Figure 6:
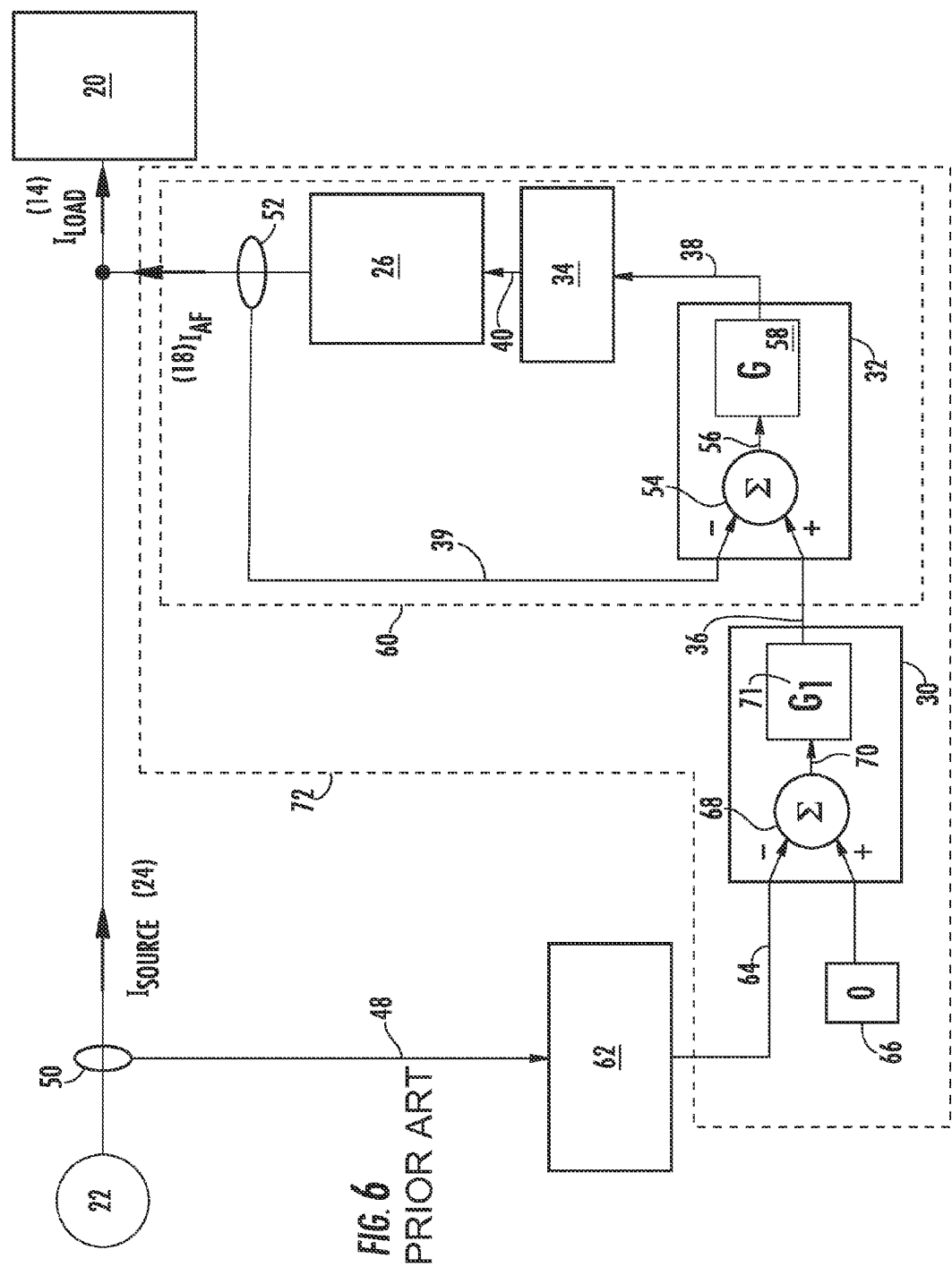
FIG. 6 is a schematic diagram of a prior art electronic active filter in a line side sensing arrangement.
Figure 7:
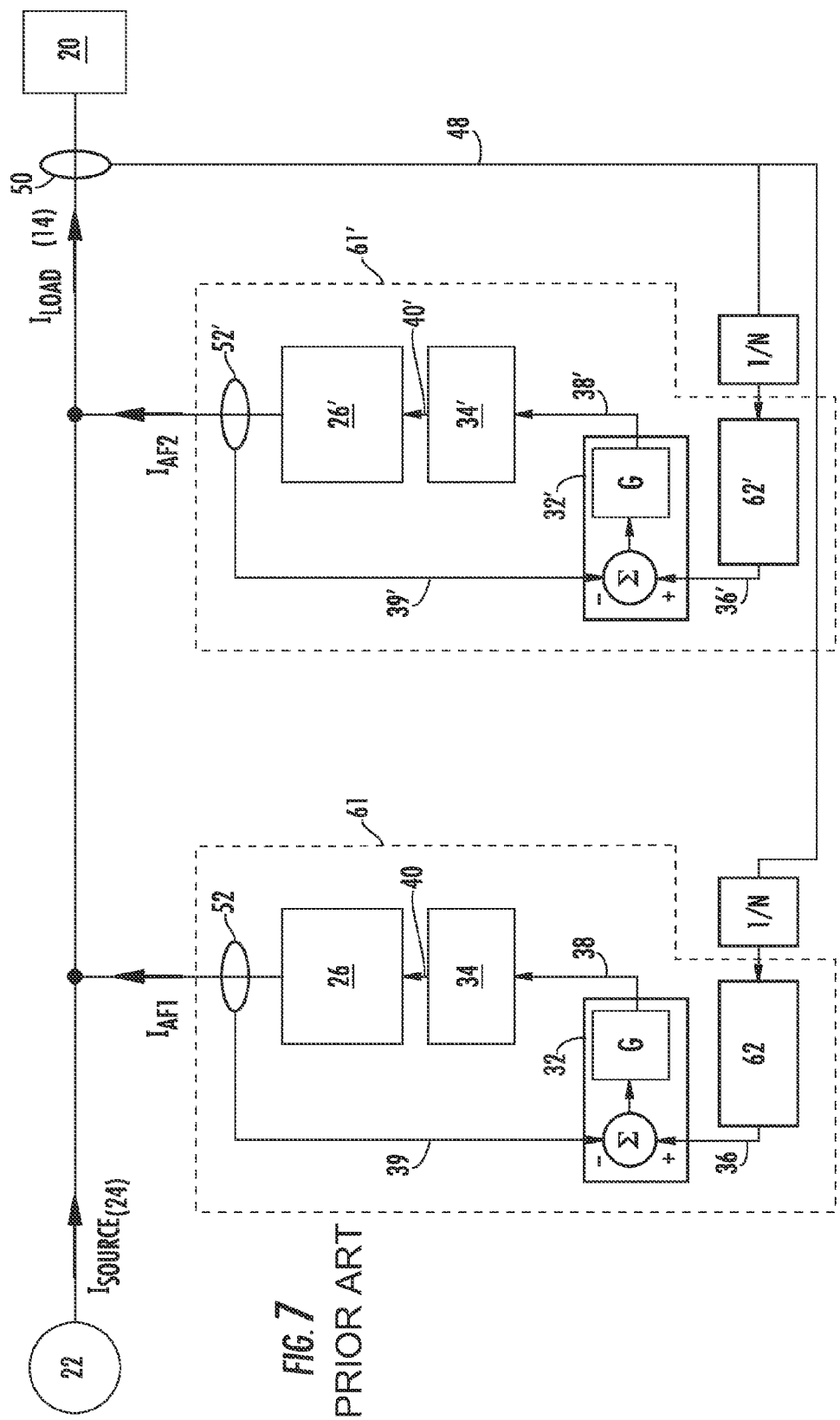
FIG. 7 is a schematic diagram of paralleling electronic active filters in a prior art load side sensing arrangement.
Figure 8:
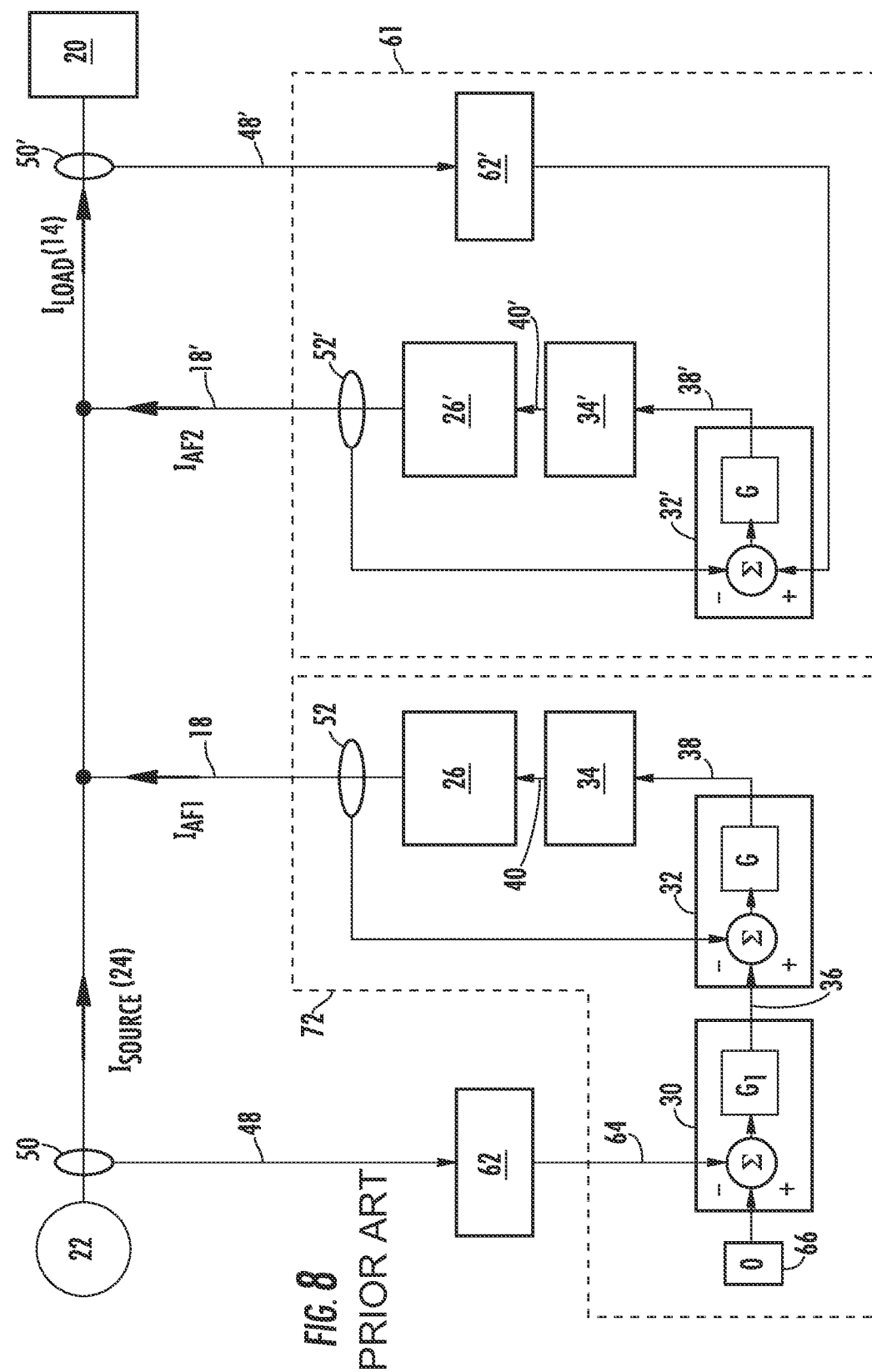
FIG. 8 is a schematic diagram of a prior art paralleling of electronic active filters in a load side sensing and line side sensing combination arrangement.
Figure 9:
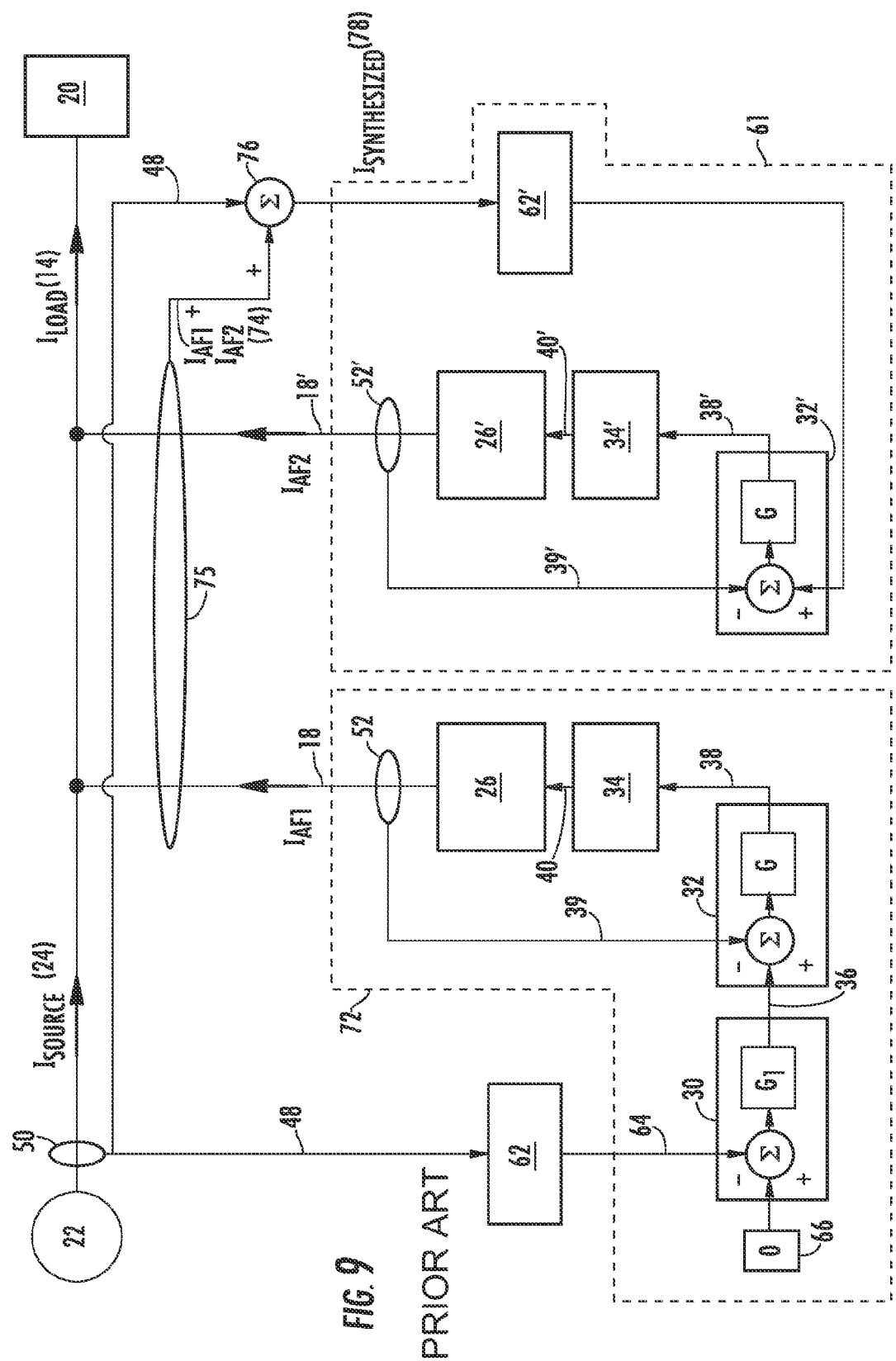
FIG. 9 is a schematic diagram of a prior art paralleling of electronic active filters in line side sensing and synthesized load line sensing arrangement.

The sensed current 48, derived as described earlier herein, is received by the first outer loop regulator 30. In the example shown in FIG. 10, the fundamental extractor or filter controller 62 previously described with respect to, for example, the single line side sensing electronic active filter shown in FIG. 6, is included in the outer loop regulators 30, 30'. At the summing junction 68 of the outer loop regulator 30, the sensed current(s) 48 is compared against the combination of the error 80 and a filter reference 66. As previously described, the filter reference 66 is set to zero in the circuit shown in FIG. 10 because it is desired that the source 22 supply no harmonic component 12. The summing junction 68 outputs the comparison or error 70 to a compensator 71, such as for example via a comparison signal. The compensator 71 generates a current reference 36 and outputs it to the inner current regulator 32. Once current reference 36 is output, the inner electronic active filter 60 is as previously described.

At the summing junction 68' of the outer loop regulator 30' the filter reference 66' is compared to the combination of the harmonic component of the sensed current(s) 48 and the error 80. The summing junction 68' outputs the comparison or error 70' to a compensator 71', such as for example via a comparison signal. The compensator 71' generates a current reference 36' and outputs it to the inner current regulator 32'. Once the current reference 36' is output, the inner electronic active filter 60' is as previously described.

The embodiment described above with regards to FIG. 10, provides control structures that allow multiple electronic active filters to be paralleled on an electrical power system and controlled using the independent and closed loop, line side sensing arrangement. To avoid circulating currents present in current parallel electronic active filter arrangements, this invention integrates the electronic active filter's internal harmonic current regulator functionality with a control function to regulate the current difference 80 between electronic active filters to a minimum. For the two parallel electronic active filter embodiment shown in FIG. 10, the circulating current can be defined as the difference, or error 80, between the respective harmonic current outputs 18, 18' of the two parallel electronic active filters. It then follows that if the harmonic current 18, 18' of each electronic active filter respectively, is controlled to be the same, e.g. harmonic component output 18 equals harmonic current output 18', then the error 80 is zero, as is the circulating current.

As described, the electronic active filters 72, 72' of the embodiment described above use the error 80 together with the sensed current(s) 48 to adjust their respective current outputs 18, 18'. For example, in a steady state, let the total harmonic component 12 demanded from the non-linear load 20 be $I_H$. In steady state, the first and second electronic active filters together provide the harmonic component 12 demanded, via harmonic current outputs 18, 18', eliminating the harmonic component 12 drawn from the source 22. If the first electronic active filter delivers more current than the second electronic active filter, the error 80 is positive. The positive error together with the sensed current(s) 48 will effectively lower the harmonic current reference 36 to the first electronic active filter causing the first electronic active filter to adjust its harmonic current output 18 lower. Simultaneously, the positive error together with the sensed current (s) 48 will increase the harmonic current reference 36' to the second electronic active filter causing the second electronic active filter to adjust its harmonic current output 18' higher. Thus, this mechanism will cause the two electronic active filters to balance their harmonic current outputs 18, 18' thereby eliminating or significantly reducing any circulating current therebetween. In the embodiment described above with regards to FIG. 10, the electronic active filters 72, 72' can additionally use the feedback measurements 39, 39' of their outputs 18,18' and/or a filter reference 66, 66' to adjust their respective current outputs 18, 18'.

The embodiment described with regards to FIG. 10 could be extended to paralleling a number of electronic active filters to the power of two in line side sensing (e.g. $2^N$ electronic active filters where N is an integer and $2^N$=2, 4, 8, 16 ... etc). In extending the number of line side electronic active filters, the number of summing junctions to calculate current difference error between filters is $2^N-1$ and the number of error inputs to each line side electronic active filters is N. One example of the extension to paralleling a number of electronic active filters is shown in FIG. 11 wherein four line side electronic active filters 72, 72', 72", 72'" are described.

Figure 11:
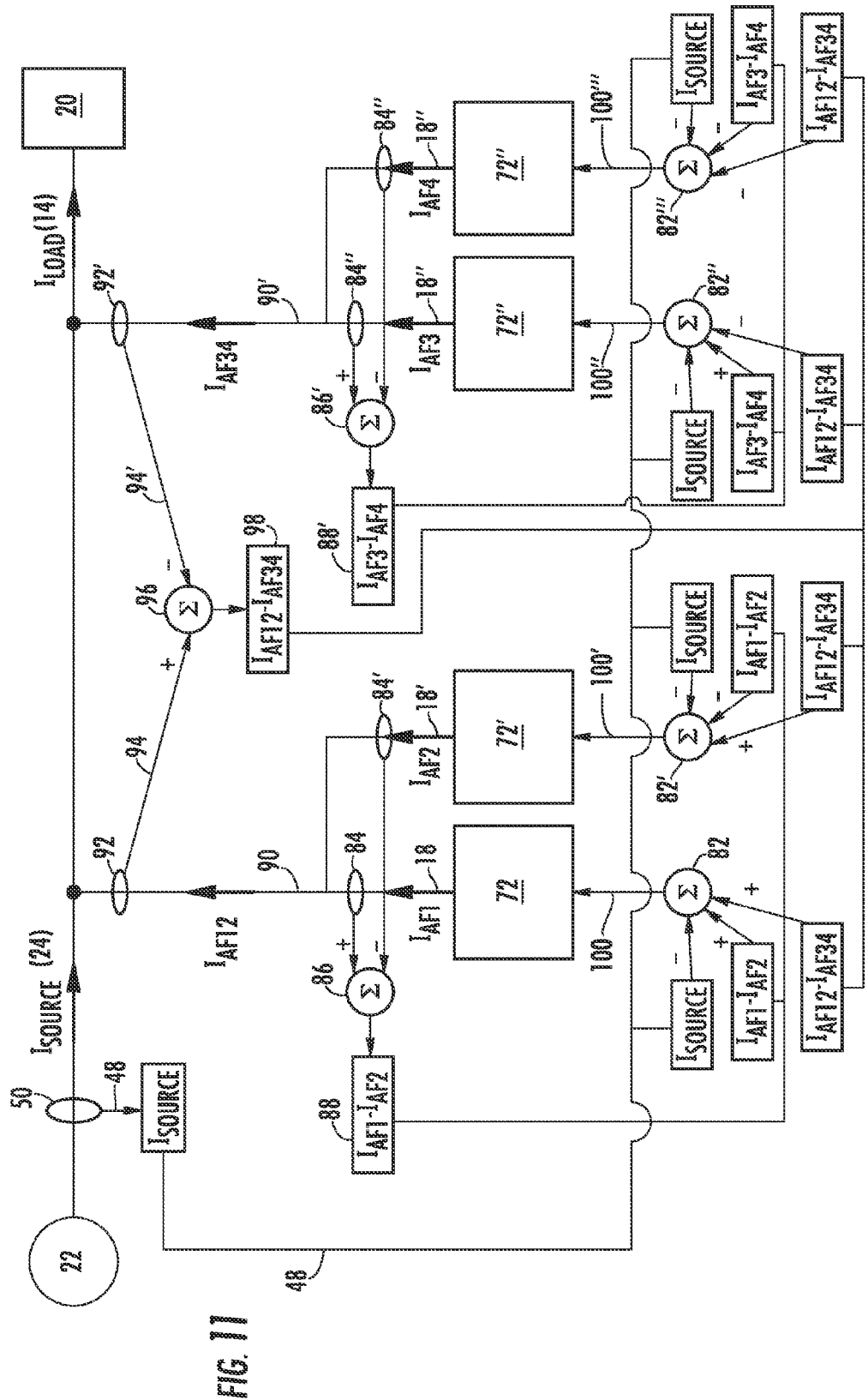
FIG. 11 is a schematic diagram of paralleling four electronic active filters in line side sensing arrangement with current difference feedback according to another embodiment of the invention.

As with the embodiment described in FIG. 10 involving two electronic active filters, the embodiment described with respect to FIG. 11 has a current sensor 50 that senses the current of the source current 24 and outputs the sensed current 48, such as for example via a signal, to respective summing junctions 82, 82', 82", 82'" of each respective line side electronic active filter 72, 72', 72", 72'". As described with respect to FIG. 10, each summing junction 82, 82', 82", 82'" of FIG. 11 has a fundamental extractor or filter controller 62 included so as to remove the fundamental component of the sensed current 48.

Each line side electronic active filter 72, 72', 72", 72'" outputs a current 18, 18', 18", 18'" respectively. Each current output 18, 18', 18", 18'" is sensed by a separate current sensor 84, 84', 84", 84'". The sensed outputs 18, 18' of the first and second line side electronic active filters 72, 72' are output to a summing junction 86. The difference or error 88 between the two harmonic current outputs 18, 18' is determined and sent to summing junctions 82, 82' of each of the first and second line side electronic active filters 72, 72'. The output of the summing junction 86 is broadly defined as the difference or error 88 between the two harmonic current outputs 18, 18' itself, a component thereof or at least a signal representing or indicating that current or the level or value of that current.

The sensed current outputs 18", 18'" of the third and fourth line side electronic active filters 72", 72'" are output to a summing junction 86'. The difference or error 88' between the two current outputs 18", 18'" is determined and output to the summing junctions 82", 82'" of each of the third and fourth line side electronic active filters 72", 72'", respectively. The output of the summing junction 86' is broadly defined as the difference or error 88' between the two harmonic current outputs 18", 18'" itself, a component thereof or at least a signal representing or indicating that current or the level or value of that current.

A combination current 90 consisting of the current outputs 18, 18' of the first and second line side electronic active filters 72, 72' is sensed by a current sensor 92. The current sensor 92 outputs the sensed combination current 94 to a summing junction 96.

A combination harmonic component 90' consisting of the harmonic current outputs 18", 18'" of the third and fourth line side electronic active filters 72", 72'" is sensed by a current sensor 92'. The current sensor 92' outputs the sensed combination harmonic component 94' to the summing junction 96. The summing junction 96 determines the difference or error 98 between the sensed combination harmonic component 94 and the sensed combination harmonic component 94' and outputs the error 98 to the summing junctions 82, 82', 82", 82'" of each line side electronic active filter 72, 72', 72", 72'" respectively. The output of the summing junction 96 is broadly defined as the difference or error 98 between the two combination harmonic components 90, 90' itself, a component thereof or at least a signal representing or indicating that current or the level or value of that current.

The summing junction 82 of the first line side electronic active filter 72 determines the difference or error 100 between the error 98 and the combination of the sensed current 48 and the error 88. The error 100 is then supplied to the outer loop regulator 30 of the first line side electronic active filter 72.

The summing junction 82' of the second line side electronic active filter 72' determines the difference or error 100' between the error 98 and the combination of the sensed current 48 and the error 88. The error 100' is then supplied to the outer loop regulator 30' of the second line side electronic active filter 72'.

The summing junction 82" of the third line side electronic active filter 72" determines the difference or error 100" between the error 88' and the combination of the sensed current 48 and the error 98. The error 100" is then supplied to the outer loop regulator 30" of the third line side electronic active filter 72".

The summing junction 82'" of the fourth line side electronic active filter 72'" determines the sum or error 100'" of the sensed current 48, the error 88' and the error 98. The error 100'" is then supplied to the outer loop regulator 30'" of the fourth line side electronic active filter 72'".

Once the respective errors 100, 100', 100", 100'" are output to the respective outer loop regulators 30, 30', 30", 30'" of each respective line side electronic active filter 72, 72', 72", 72'", the line side electronic active filters 72, 72', 72", 72'" operate as previously described with regards to line side electronic active filter 72 in FIG. 6 wherein the respective errors 100, 100', 100", 100'" are compared to a filter reference.

As described above, each pair of electronic active filters, e.g. the first and second line side electronic active filters 72, 72', receives the outputs of the sensed current 48 and the error difference between those two electronic active filters, in this example, error 88, as they would if only the two line side electronic active filters 72, 72' were in parallel. In addition, to control the circulating current between each pair of electronic active filters, the error 98 between each pair of electronic active filters is received by each electronic active filter. This could be applied to virtually any number of electronic active filters to the power of two in a line side sensing configuration.

Although the exemplary embodiment shown and described in FIG. 11 shows one way of measuring, calculating and receiving the error, e.g. 88, other ways are possible. For example the error, in this example error 88, could be measured using one current transducer for the current output, e.g. 18, 18', of each pair of line side electronic active filters, e.g. 72, 72' such as described with respect to the current sensor 75 shown in FIG. 10. Further, the error, e.g. 88, and the sensed current 48 could each be sent directly to the outer loop regulator 30, 30', of each line side electronic active filter 72, 72' respectively. Another alternative would be to send the sensed current output, e.g. 18, 18', 18", 18'" from each of the current sensors, e.g. 84, 84', 84", 84'", to a single microcontroller that can be programmed to compute all the desired errors and output them to the desired electronic active filter. Furthermore, electronic active filters of different current ratings could be paralleled using a feedback scaling factor applied to error, e.g. 88, prior to being output to the outer loop regulator 30, 30' of each line side electronic active filter 72, 72', respectively.

Figure 12:
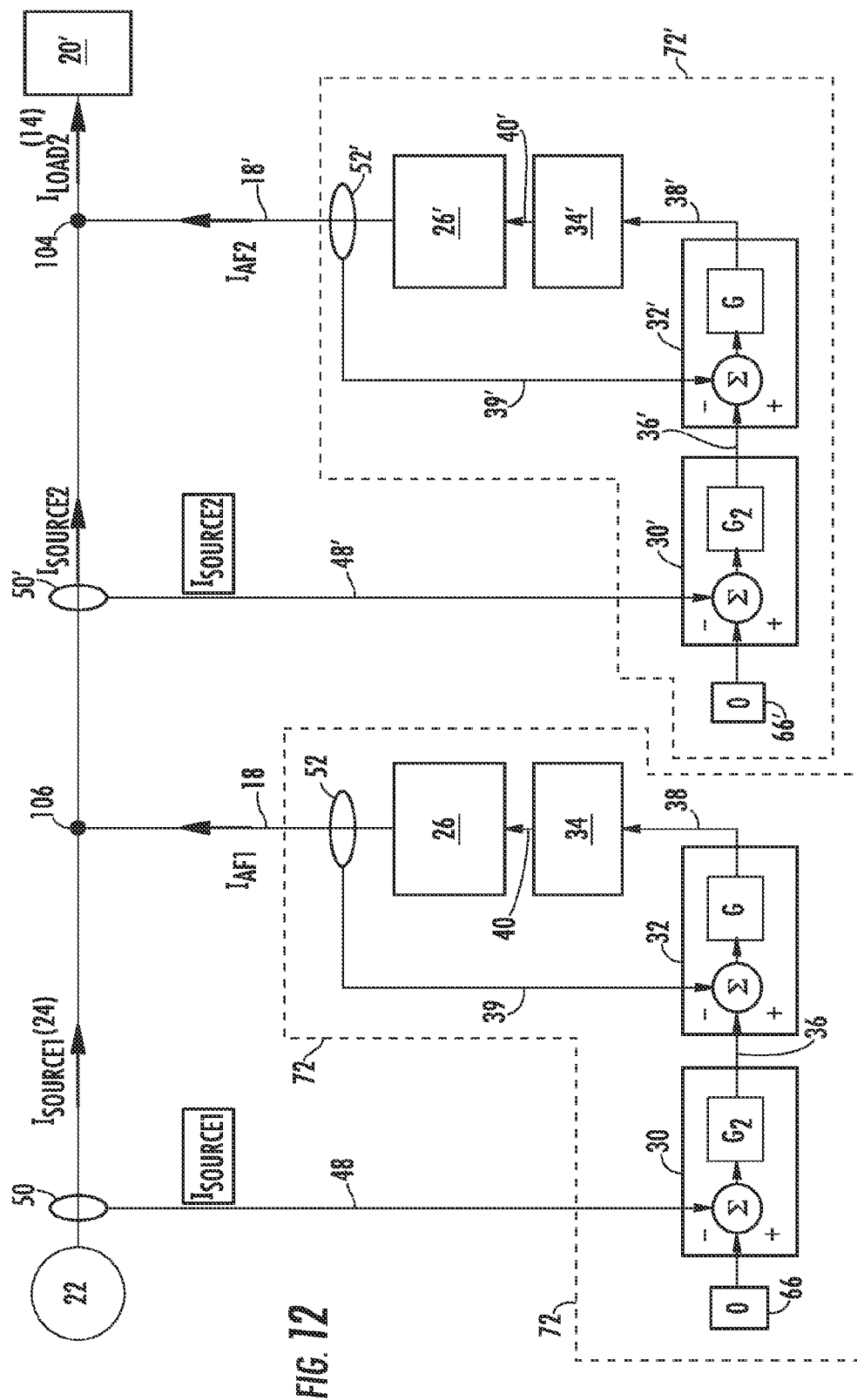
FIG. 12 is a schematic diagram of paralleling electronic active filters in line side sensing with cascading source sensing arrangement in accordance with another embodiment of the present invention.

The paralleling of electronic active filters can also be accomplished using a cascading line side sensing configuration. Referring to FIG. 12, a current sensor 50 senses the source current 24 from which one or more non-linear loads 20' are drawing current, and outputs the sensed current 48, such as for example via a signal, to the outer loop regulator 30 of the first line side electronic active filter 72. Once sensed current 48 is output to the outer loop regulator 30 of the line side electronic active filter 72, the line side electronic active filter 72 operates as previously described, supplying the harmonic current output 18 at location 106, downstream from current sensor 50.

A second current sensor 50' senses the current, $I_{Source2}$, of the source current 24 at a location 102 downstream from location 106, and upstream from where the harmonic current output 18' of the second line side electronic active filter 72' is supplied to the electrical system at location 104. The second sensed current 48' is output, such as for example via a signal by second current sensor 50', to the outer loop regulator 30' of the second line side electronic active filter 72'. Once the second sensed current 48' is output to the outer loop regulator 30' of the line side electronic active filter 72', the line side electronic active filter 72' operates as previously described with regards to the line side electronic active filter 72.

Because the current sensor 50' is downstream of both the current sensor 50 and the location 106 where the current output 18 of the first line side electronic active filter 72 is supplied to the electrical system, the sensed current 48 is equal to the difference of the sensed current 48' and the harmonic current output 18 of the first line side electronic active filter 72.

The cascaded line side sensing arrangement is effective in minimizing circulating current between electronic active filters because of the separate locations of the current sensors 50, 50'. The second line side electronic active filter 72' supplies its harmonic current output 18' to cancel any harmonic component 12 drawn by the set of non-linear loads 20', independent of and unaffected by the harmonic current output 18 of the first line side electronic active filter 72. If a portion of the harmonic current output 18' of the second line side electronic active filter 72' did circulate into the first line side electronic active filter 72, it would be detected by the current sensor 50' and minimized by the outer loop regulator 30' of the second line side electronic active filter 72'. The first line side electronic active filter 72 supplies its harmonic current output 18 to cancel harmonic component remaining in the sensed current 48' after the second line side electronic active filter 72' has supplied its harmonic current output 18'. The arrangement described with regards to FIG. 12 can be extended to any practical number of additional line side electronic active filters upstream of the first line side electronic active filter 72 in the same manner.

In the embodiment described above with regards to FIG. 11, the electronic active filters 72, 72' use the sensed currents 48, 48' together with the feedback measurements 39, 39' of their outputs 18,18' to adjust their respective current outputs 18, 18'. In this embodiment, the electronic active filters 72, 72' can additionally use a filter reference 66, 66' to adjust their respective current outputs 18, 18'. Because of the separate locations of the current sensors 50, 50', this arrangement allows for the flexible location of linear and non-linear loads. Both linear and non-linear loads can be placed not only at the end of the electrical system and downstream of all electronic active filters, e.g. 20' as shown in FIG. 12, but also interspersed in the electrical system as shown in FIG. 13.

Figure 13:
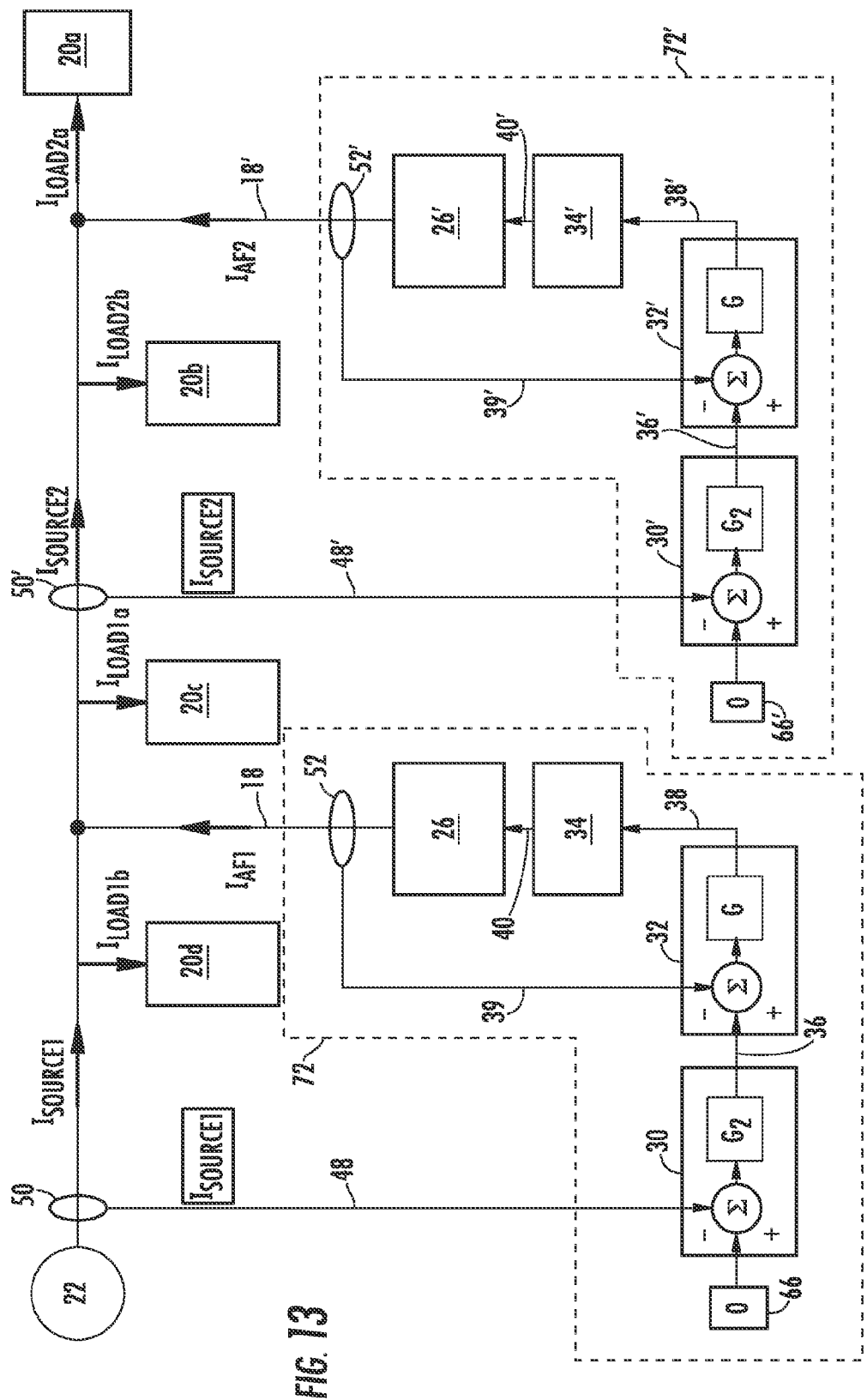
FIG. 13 is a schematic diagram of paralleling electronic active filters in line sensing arrangement with cascading source sensing and multiple load locations, in accord with still another embodiment of the present invention.

Referring to FIG. 13, the first and second line side electronic active filters 72, 72' are substantially as described with regards to FIG. 12. The set of non-linear loads 20' shown in FIG. 12 are, in FIG. 13, dispersed throughout the electrical system. In this exemplary arrangement, all non-linear loads are filtered by one or more electronic active filters because of the location of the current sensors. In the exemplary embodiment shown in FIG. 13, the harmonic components 12 drawn by the non-linear loads 20*a* and 20*b* are supplied by the harmonic current output 18' of the second line side electronic active filter 72' because the non-linear loads 20*a* and 20*b* are downstream of the current sensor 50'.

The harmonic components 12 drawn by the non-linear loads 20*c* and 20*d* are entirely supplied by the harmonic current output 18 of the first electronic active filter 72 as are any remnant harmonic component drawn by non-linear loads 20*a* and 20*b* that are not fully supplied by the harmonic current output 18' of the second line side electronic active filter 72. Again, this arrangement works because the non-linear loads 20*a*-20*d* are downstream of the current sensor 50.

The paralleling of electronic active filters can also be accomplished using a synthesized cascading line side sensing arrangement. Synthesizing the source current can reduce the size and cost of current sensors. The current sensor 110 in FIG. 14 for example, will typically be smaller and lower cost than the source current sensor 50' in FIG. 13, because the current 18 is typically a lower amperage than $I_{source2}$.

Figure 14:
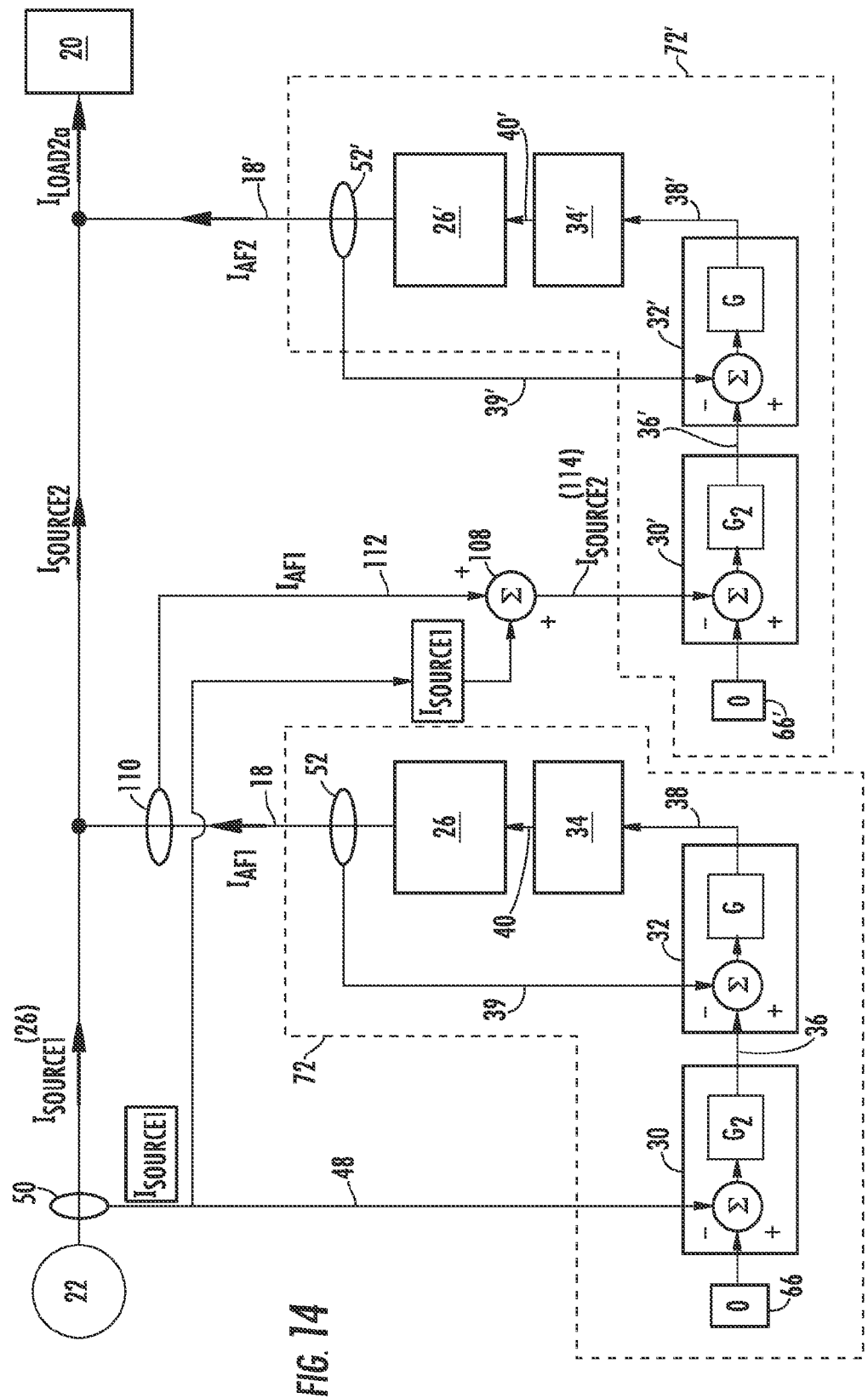
FIG. 14 is a schematic diagram of paralleling electronic active filters in line sensing arrangement with synthesized cascading source sensing, according to yet another embodiment of the present invention.

Referring to FIG. 14, a current sensor 50 senses the current of the source current 24 from which a set of non-linear loads 20' are drawing, and outputs the sensed current 48. In this embodiment, the sensed current 48 is output both to the outer loop regulator 30 of the first line side electronic active filter 72 and also to a summing junction 108. Once sensed current 48 is output to the outer loop regulator 30 of the first line side electronic active filter 72, the line side electronic active filter 72 operates as previously described. As such, the first electronic active filter 72 uses the sensed current(s) 48 together with the feedback measurements 39 of output 18 and a filter reference 66 to adjust its current output 18.

A second current sensor 110 is employed to sense the current output 18 being supplied by the first line side electronic active filter 72. The second current sensor 110 outputs the sensed harmonic current 112 to the summing junction 108. The summing junction 108 sums the sensed harmonic current 112 and the sensed current 48 to create a synthesized source current 114. The synthesized source current 114 is fed to the outer loop regulator 30' of the second line side electronic active filter 72', which from thereon operates as previously described. As such, the second electronic active filter 72' uses the sensed current(s) 48 together with the feedback measurements 39' of output 18', the sensed harmonic current 112 from output 18 and a filter reference 66' to adjust its current output 18'.

Although the invention has been herein described in what is perceived to be the most practical and preferred embodiments, it is to be understood that the invention is not intended to be limited to the specific embodiments set forth above. For example, many of the illustrated examples described above relate to the production of a harmonic current. However, the electronic after filter arrangements discussed above could also be used to produce other current without departing from the spirit of the invention, such as, for example, volt-ampere reaction. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A method of reducing circulating current between two line side sensing electronic active filters comprising:

sensing a first source current from a source at a first location and generating a first source current level signal on the basis of an amount of the first source current sensed;

sensing a second source current at a second location downstream from the first location and generating a second source current level signal on the basis of an amount of the second source current sensed;

generating a first current component and supplying the first current component downstream from the first location;

generating a second current component and supplying the second current component downstream from the second location;

sensing the first current component and generating a first current component level signal on the basis of an amount of the first current component sensed;

sensing the second current component and generating a second current component level signal on the basis of an amount of the second current component sensed;

using the first source current level signal and the first current component level signal to adjust the first current component; and using the second source current level signal and the second current component level signal to adjust the second current component.

2. The method of claim 1, further comprising adjusting the first current component by additionally using a filter reference signal.

3. The method of claim 2 further comprising adjusting the second current component by additionally using a second filter reference signal.

4. A method of reducing circulating current between two line side sensing electronic active filters comprising:

sensing a first source current from a source at a first location and generating a first source current level signal on the basis of an amount of the first source current sensed;

sensing a second source current at a second location downstream from the first location and generating a second source current level signal on the basis of an amount of the second source current-sensed;

generating a first current component, by means of a first line side sensing electronic active filter, and supplying the first current component downstream from the first location;

generating a second current component, by means of a second line side sensing electronic active filter, and supplying the second current component downstream from the second location;

sensing the first current component and generating a first current component level signal on the basis of an amount of the first current component sensed;

sensing the second current component and generating a second current component level signal on the basis of an amount of the second current component sensed;

using the first source current level signal and the first current component level signal to adjust the first current component; and using the second source current level signal and the second current component level signal to adjust the second current component.

5. The method of claim 4, further comprising adjusting the first current component by additionally using a filter reference signal.

6. The method of claim 5 further comprising adjusting the second current component by additionally using a second filter reference signal.

7. A method of reducing circulating current between two line side sensing electronic active filters comprising:

sensing a first source current from a source at a first location and generating a first source current level signal on the basis of an amount of the first source current sensed;

determining a second source current at a second location downstream from the first location and generating a second source current level signal on the basis of an amount of the second source current determined;

generating a first current component, by means of a first line side sensing electronic active filter, and supplying the first current component downstream from the first location;

generating a second current component, by means of a second line side sensing electronic active filter, and supplying the second current component downstream from the second location;

sensing the first current component and generating a first current component level signal on the basis of an amount of the first current component sensed;

sensing the second current component and generating a second current component level signal on the basis of an amount of the second current component sensed;

using the first source current level signal and the first current component level signal to adjust the first current component; and using the second source current level signal and the second current component level signal to adjust the second current component;

the step of determining the second source current being accomplished by combining the first source current level signal with the first current component level signal.

8. The method of claim 7, further comprising adjusting the first current component by additionally using a filter reference signal.

9. The method of claim 8 further comprising adjusting the second current component by additionally using a second filter reference signal.

* * * * *